May 12, 1959 E. M. LEE 2,886,105
CHAIN GATE FOR OPEN TOP TRUCKS
Filed Dec. 24, 1956 3 Sheets-Sheet 2

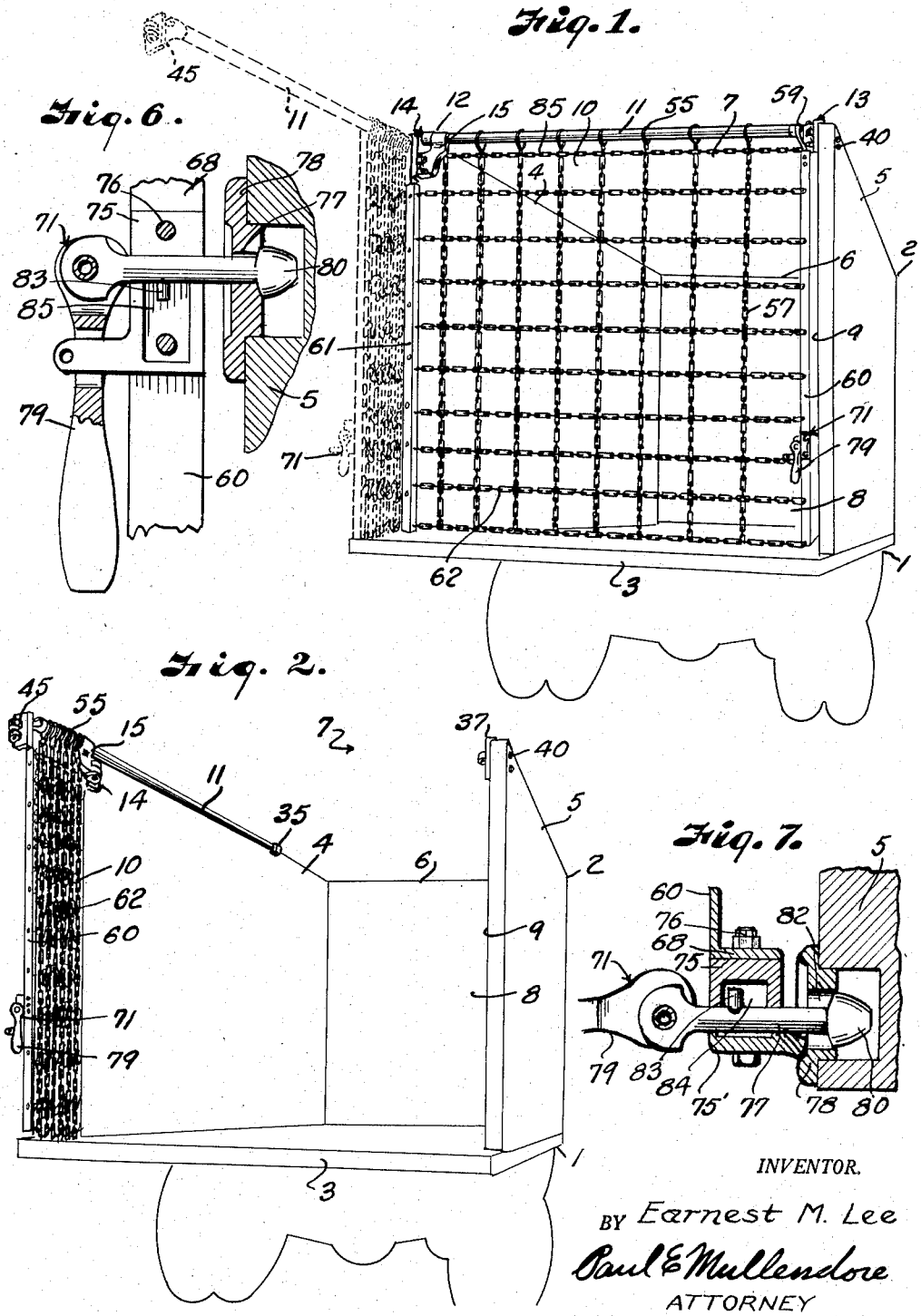

INVENTOR.
BY Earnest M. Lee
ATTORNEY

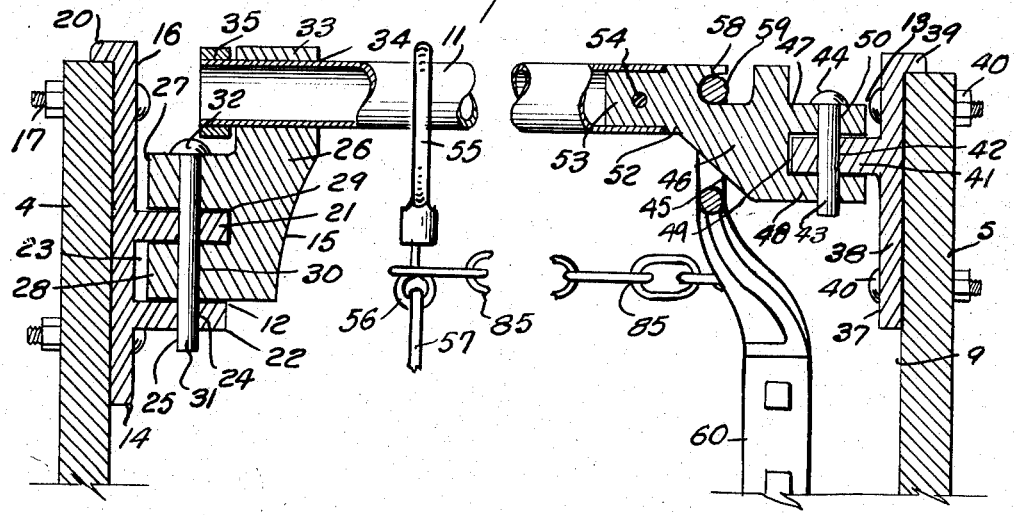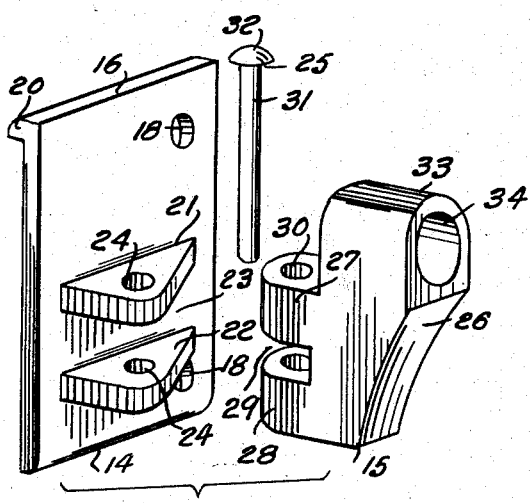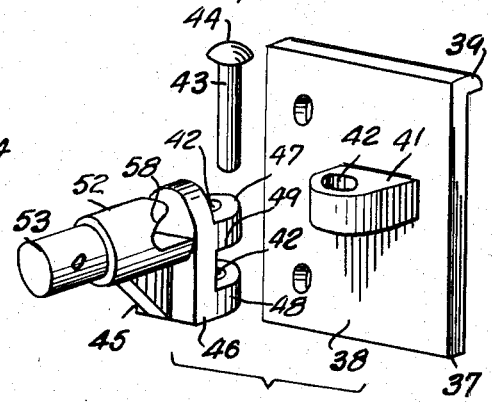

United States Patent Office 2,886,105
Patented May 12, 1959

2,886,105

CHAIN GATE FOR OPEN TOP TRUCKS

Earnest M. Lee, Mission Hills, Kans., assignor to Roll-O-Matic Chain Company, Kansas City, Mo., a corporation of Missouri Application December 24, 1956, Serial No. 630,285

4 Claims. (Cl. 160—328)

This invention relates to a chain gate for trucks, trailers and similar vehicles and which is of the type including a transverse bar suspending a series of chains that are interconnected by transverse chains, the latter chains being fixed at one end and the other ends connected with a tensioning bar that is slideable along the transverse bar to open and close the gate. Chain gates of this character are very satisfactory for van type of trucks, but they have not been used in conjunction with open top trucks for the reason that the transverse bar interferes with loading and unloading thereof.

Therefore, the principal object of the present invention is to provide a chain gate that operates satisfactorily on open top trucks.

Other objects of the invention are to provide a chain gate having means for hingedly and slideably supporting one end of the transverse bar at one side of the truck and having a releasable means for attaching the other end of the bar when the gate is in closed position and which, when the bar is released, the bar may be swung rearwardly in a longitudinal direction and then moved retractably to an out of way position along the inner, upper side of the adjacent side wall of the truck. It is also an object to provide a chain gate structure that is of simple construction and easy to operate. It is a further object to provide a gate construction which is easy to install on an open top truck body.

In accomplishing these and other objects of the invention as hereinafter pointed out, I have provided improved structure the preferred form of which is illustrated in the accompanying drawings, wherein:

Fig. 1 is a rear end view of an open top truck equipped with a chain gate embodying the features of the present invention, the gate being shown in full lines when in closed position and in dotted lines when the supporting bar is swung outwardly and ready to be moved retractably along the upper edge of one side wall of the truck.

Fig. 2 is a similar view but showing the bar in its inward position and supporting the chains in gathered relation at the end of the side wall of the truck.

Fig. 6 is a vertical section of the clamp for securing the lower end of the tensioning bar for tensioning the horizontal chains of the gate, the clamp bolt being shown in engagement with the keeper.

Fig. 7 is a horizontal section showing entrance of the clamp bolt into the keeper.

Fig. 8 is an enlarged transverse section through the brackets particularly illustrating the pin connections thereof.

Fig. 9 is a perspective view of the bracket parts forming the hinge support for the bar.

Fig. 10 is a similar view of the parts forming the support for the free end of the bar.

Figure 3:
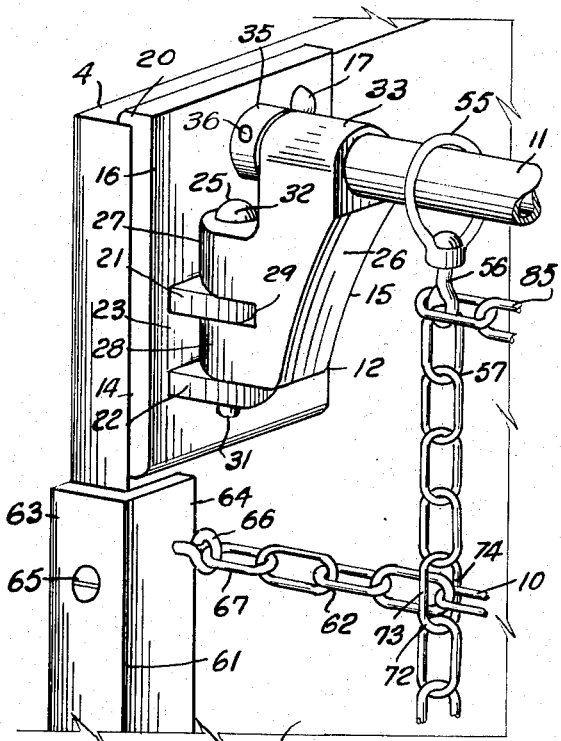
Fig. 3 is an enlarged perspective view of the fixture for hingedly and slidably supporting an end of the transverse bar.

Referring more in detail to the drawings:

1 designates a conveyance for transporting freight and the like, such as a motor truck or trailer. The conveyance 1 includes a body 2 having a floor 3, side walls 4 and 5, a forward end 6 and an open top 7 forming an open top compartment 8 for containing goods and the like while under transportation. Usually such trucks have an open rear end 9 closed by substantially heavy end gates which are difficult to manipulate and interfere with backing the truck into loading docks and other close places, however in accordance with the present invention the open end is closed by means of a chain gate 10 which is easily operated and which may be moved to an out of way position when not in use. The gate 10 includes a transverse bar 11 which is preferably formed of pipe or other tubular material and having a length to extend horizontally between the upper portions of the side walls 4 and 5 and to be carried therefrom by supports or fixtures 12 and 13.

Figure 4:
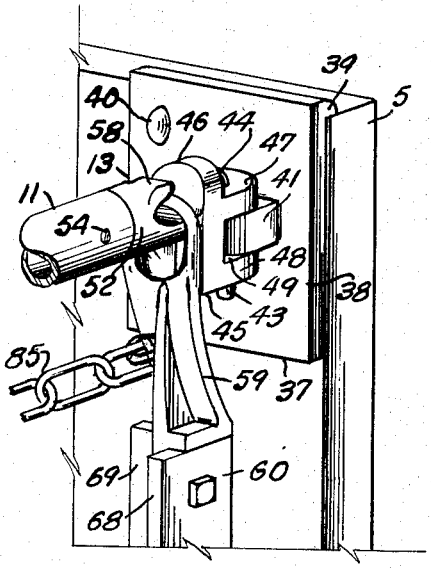
Fig. 4 is a similar view of the fixture for supporting the opposite end of the bar.
Figure 5:
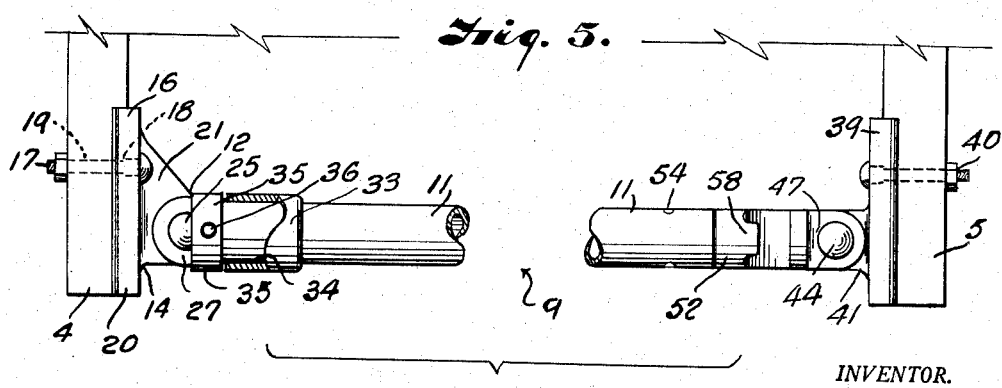
Fig. 5 is a plan view of the respective ends of the bar and its supports.

The fixture 12 includes a fixed bracket 14 and a hinged bracket 15. The bracket 14 has a substantially flat plate portion 16 that is adapted to be attached to the inner side face of the wall 4 by means of bolts 17 that extend through openings 18 in the plate portion and through registering openings 19 in the side wall of the truck. The plate portion 16 of the bracket is preferably provided along the top edge thereof with a flange 20 that engages over the top edge of the wall 4 to facilitate placement thereof and to cooperate with the bolts 17 in maintaining a rigid attachment for the bracket. The bracket also has ears 21 and 22 that project from the inner face of the plate portion 16 and are spaced apart as at 23. The plate portion 16 is substantially wider than the width of the ears so that the bolts 17 may be offset therefrom, as best shown in Figs. 3, 4 and 5. The ears 21 and 22 are provided with registering openings 24 (Figs. 8 and 9) for mounting a hinge pin 25.

The bracket 15 of the fixture 12 has a substantially vertical body portion 26 carrying laterally projecting ears 27 and 28 similar to the ears of the bracket member 14, the lower ear 28 being of a size to engage within the space 23 between the ears 21 and 22 and the ears 27 and 28 are spaced apart as at 29 to accommodate the ear 21 therein. The ears 27 and 28 also have axial openings 30 registering with the openings 24 in the ears 21 and 22 of the other bracket 14. The hinge pin 25 has a shank portion 31 that extends through the registering openings of the ears and a head 32 that engages the upper face of the ear 27 to hold the pin in position and form a pivot on which the bracket 15 swings from a position at substantially right angles to the side wall 4 to a position substantially parallel therewith. Extending upwardly from the body portion 26 of the bracket 15 is a substantially horizontal sleeve portion 33 having an axial bore 34 for slidably containing the bar 11 whereby that end of the bar 11 is slidably mounted and hingedly connected with the side wall 4 of the truck body. In order to prevent retraction of the bar 11 and its removal from the sleeve portion 33 the bar preferably projects from the sleeve portion 33 at the end thereof nearest the hinge pin 25 and the projecting end carries a stop collar 35 that is secured thereto by a fastening device 36.

The fixture 13 carrying the opposite end of the bar includes a fixed bracket 37 having a plate portion 38 for attachment to the inner face of the side wall 5 of the truck. The plate portion 38 has a flange 39 that engages over the top edge of the side wall 5, as best shown in Figs. 4, 5, 7 and 9. The plate portion 38 of the bracket 37 is secured with the flange 39 abutting against the top edge of the side wall by fastening devices such as bolts 40. The bolts 40 pass through openings in the plate portion 38 and through the side wall 5 of the truck, as best shown in Fig. 5.

The plate portion of the bracket has an ear 41 provided with an opening 42 for passing the shank 43 of a latch pin 44 which has a head at one end. The fixture 13 also includes a bracket 45 having a body portion 46 carrying ears 47 and 48 that extend laterally therefrom in spaced apart relation as indicated at 49 to accommodate therein the ear 41. The ears 47 and 48 also have openings 50 registering with the opening 42 when the shank 43 of the latch pin 44 is passed therethrough as shown in Fig. 7.

Projecting laterally from the body portion 46 is a cylindrical head 52 which has a reduced portion 53 that projects coaxially therefrom to engage within the open end of the transverse bar 11 and to be secured thereto by fastening devices such as a rivet 54 that passes through diametrical openings of the bar and portion 53 so that the bracket 45 is fixed to and forms a part of the bar.

Slidable along the bar and retained between the brackets 15 and 45 is a series of rings 55 that swively carry eyes 56 (Fig. 3) to which upper ends of vertical chains 57 are connected. The chains 57 depend from the transverse bar and their lower ends terminate substantially even with the floor 3 of the conveyance. Also slidable on the transverse bar and adapted to seat within a hook portion 58 of the lug 51 is a hanger 59 on the upper end of a bar 60 (Fig. 4) that cooperates with a fixed bar 61 for supported a series a horizontal chains 62 therebetween. The fixed bar 61 is preferably an angle having the flanges 63 and 64 thereof engaging the end and inner face side of the wall 4 to be attached thereto by suitable fastening devices such as screws 65. The inturned flange 64 carries a vertical series of eyes 66 for attaching end links 67 of the transverse chains 62. The tensioning bar 60 is also in the form of an angle having flanges 68 and 69, with the flange 69 carrying a series of eyes similar to the eyes 66 and which are spaced apart in conformity with the spacing of the eyes 66 for connecting links at the opposite ends of the horizontal or transverse chains 62 whereby the horizontal or transverse chains may be tensioned across the rear opening of the truck when the hanger 59 of the bar 60 is engaged in the hook portion 58 of the lug 51.

The lower end of the tensioning bar 60 is secured by a clamp 71, later to be described. The transverse chains are preferably connected with the depending chains 62 by passing them through selected links 72 of the depending chains 57, as best shown in Fig. 3. The chains are readily threaded through the selected links by spreading the side bars 73 and 74 of the desired links apart and threading the transverse chains 62 therethrough, after which the side bars 73 and 74 are returned to normal position to engage selected links of the transverse chains therebetween, as shown in Fig. 3. With this arrangement the chains are flexibly connected together so that the transverse chains hang loosely in loops between the depending chains when the depending chains, including the tensioning bar, are moved to a lateral position alongside the wall 4 of the truck when the gate is in open position, and when the bar is swung outwardly and moved into parallel relation with the inner face of the wall 4, as shown in Figs. 1 and 2.

The clamp 71 includes blocks 75 and 75' (Figs. 6 and 7) that are secured to the flange 68 of the tensioning bar 60 by fastening devices 76 to form a guide for the bolt 77 which also passes through a keeper 78. The bolt 78 is actuated by means of a cam lever 79 on one end of the bolt 77 which draws a head 80 on the opposite end of the bolt 78 into clamping engagement with the keeper 78 that is attached to the end of the wall 5 of the truck, as best shown in Figs. 6 and 7. The head 80 is elongated in one transverse direction to pass through an elongated slot 82 of the keeper 78 when the cam lever 79 of the bolt 77 is turned to project the head 80 of the bolt 77 through the slot 82 of the keeper 78 (Fig. 7), and when the cam lever 79 is swung downwardly the head 80 is turned to prevent retraction of the head through the slot 82 upon camming action of the lever 79 (Fig. 6). The movement of the bolt 77 is limited by means of a lug 83 thereon engaging the walls of a recess 84 in the block 75. In order to draw the rings 55 evenly along the bar or rod 11 and to facilitate closure of the gate, the rings are interconnected by a lead chain 85 (Figs. 1 and 8). The connection between the rings 55 is effected by passing the shanks of the eyes 56 through certain of the links of the lead chain 85 and the endmost link is connected to the hanger 59 (Fig. 8).

Assuming that the chain gate is mounted on an open top truck as described, the operation is as follows: If the gate is in closed position, the hinge bracket 15 is at right angles to the side wall 4 to extend the transverse bar 11 across the rear opening 9 of the truck 1. The ears 47 and 48 of the bracket 45 may be connected to the ear 41 of the fixed bracket 37 by the pin 44. The tensioning bar 60 extends the transverse chains 62 and depending chains 57 are spaced along the transverse bar 11. The hanger 59 of the tensioning bar 60 is in engagement with the hook portion 58. The locking bolt 77 is connected with the keeper 78 and the horizontal chains 62 of the gate are in tension.

When the gate is to be opened, the cam lever 79 is released to release the lower portion of the tensioning bar 60, whereupon the tensioning bar 60 may be lifted to move the hanger 59 out of engagement with the hook portion 58, whereupon it may then be shifted along the bar 11 to the opposite side wall 4 so that the chains 57 hang along the side thereof and in an out of way position when loading and unloading the truck. The horizontal bar 11 is also moved to an out of way position, thus completely removing the gate from closing the truck opening 9. This is effected by withdrawing the pin 44 to disconnect the bracket 45 from the bracket 37 of the fixture 13, whereupon the bar 11 may be swung outwardly and rearwardly of the truck to the position shown in dotted lines, Fig. 1, with the depending chains 57 moving therewith so that the axes of the rings 55 are parallel with the side wall 4. The bar 11 may then be slid retractably through the rings 55 and sleeve portion 33 of the bracket 15 until the bracket 45 is stopped by the tensioning bar 60. The lower end of the tensioning bar 60, including the depending chains 57, may be gathered together and secured by means of a chain or other flexible fastening means (not shown) that may be fixed to the side wall 4 of the truck and wrapped about the chains and tensioning bar 60 to prevent swinging thereof. When the gate is to be closed, the bar or rod 11 is withdrawn through the sleeve 33 until it is stopped upon engagement of the collar 35 with the sleeve 33 of the bracket 15. The bar 11 is then in the position shown in dotted lines in Fig. 1, after which the bar 11 is swung about on the hinge pin 25 to bring the bracket 45 into re-engagement with the bracket 37 of the fixture 13. When the ears 47 and 48 on the bracket 45 are interengaged with the ear 41 of the bracket 37 the shank 43 of the pin 44 may be passed through the openings 50 and 42 of the ears 47, 48, and 41 to secure the transverse bar 11 to the side wall 5. The tensioning bar 60 is then drawn along the bar 11 until the hanger 59 thereof engages the hook portion 58. The lead chain 85, being connected with the rings 55 and the hanger 59, causes the depending chains to be easily distributed in proper relation along the length of the bar 11. The horizontal chains 62 are then tensioned across the opening by manipulation of the cam lever 79 to reengage the head 80 of the bolt 77 with the keeper 78 (Fig. 6).

From the foregoing it is obvious that I have provided a chain gate which is especially adapted for the needs of an open top truck in that the entire gate mechanism may be removed to an out of way position along one side of the truck so as not to interfere with the loading and unloading thereof.

Attention is directed to the feature of the invention whereby the weight of the chain closure is on one side of the hinge brackets and the major weight of the bar is on the opposite side, so as to substantially balance the load on the hinge brackets when the closure is in open position.

What I claim and desire to secure by Letters Patent is:

1. A chain gate for an open top truck body having side walls, said chain gate including, a transverse bar, a bracket adapted to be fixed to one side wall of the truck and having spaced apart ears, a complementary bracket having ears engaging between the spaces of the ears of the fixed bracket, a hinge pin extending through the ears of both brackets to hingedly connect the brackets, means on the complementary bracket for slidably containing one end of the transverse bar, means on the transverse bar for suspendingly supporting the chain closure, and means for releasably supporting the other end of the transverse bar from the other side wall of the truck to move the transverse bar to a position longitudinally of the truck body for sliding the transverse bar inwardly of the truck body.

2. A chain gate for closing an opening between spaced side walls, said chain gate including a transverse bar, a bracket adapted to be fixed to one side wall and having spaced apart ears, a complementary bracket having ears engaging between the spaces of the ears of the fixed bracket, a hinge pin extending through the ears of both brackets to hingedly connect the brackets, means on the complementary bracket for slideably containing one end of the transverse bar, a chain closure, means slideable on the transverse bar for suspendingly supporting the chain closure, a bracket fixed to the other side wall and having an ear, a complementary bracket fixed to the other end of the transverse bar and having spaced apart ears engaging the ear of the last named bracket, and a removable pin passing through the ears of the last named brackets for cooperating with the brackets at the opposite end for supporting the bar transversely between said side walls, said pin being removable to release the transverse bar for movement from transverse to a longitudinal position.

3. A chain gate for a truck body which has spaced apart side walls, said chain gate including a hinge bracket having a fixed part for attachment to an upper portion of one of the side walls and having a movable part connected with the fixed part by a hinge pin extending through said parts and providing a vertical axis upon which the movable part is adapted to hinge, said movable part having a horizontal sleeve portion, a horizontal transverse rod having one end slideably supported in said sleeve portion and extending in one position traversely between said side walls and in another position parallel with the side walls when the movable part of the bracket turns on the hinge pin, a bracket adapted to connect the transverse rod with the opposite side wall and having a fixed part adapted to be secured to said opposite side wall and a part fixed to and carried by said rod, means removably interconnecting the parts of the last named bracket member, rings slideable on the transverse bar, chains depending from said rings, transverse chains connected with the depending chains, means securing one end of the transverse chains to the side wall to which the hinge bracket is secured, and a tensioning bar connected with the other ends of the transverse chains and having a hanger slideable along the transverse bar to tension said chains and movable retractively along the transverse bar for gathering the chains at the side wall to which the hinge bracket is secured, said transverse rod being adapted to swing rearwardly of the truck body incidental to hinging of the movable part of the hinge bracket on the hinge pin that extends through the fixed part of the hinge bracket and said transverse rod being slideable through said sleeve portion of the movable bracket to retract the transverse rod through said sleeve portion to said other position with the chains in said gathered position between the bracket part on said bar and the hinge bracket.

4. A chain gate for a truck body which has spaced apart side walls, said chain gate including a hinge bracket having a fixed part for attachment to an upper portion of one of the side walls and having a movable part connected with the fixed part by a hinge pin extending through said parts and providing a vertical axis upon which the movable part is adapted to hinge, said movable part having a horizontal sleeve portion, a horizontal transverse rod having one end slideably supported in said sleeve portion and extending in one position traversely between said side walls and in another position parallel with the side walls when the movable part of the bracket turns on the hinge pin, a bracket adapted to connect the transverse rod with the opposite side wall and having a fixed part adapted to be secured to said opposite side wall and a part fixed to and carried by said rod and having a transverse seat, means removably interconnecting the parts of the last named bracket member, rings slideable on the transverse bar, chains depending from said rings, transverse chains connected with the depending chains, means securing one end of the transverse chains to the side wall to which the hinge bracket is secured, and a tensioning bar connected with the other ends of the transverse chains and having a hanger slideable along the transverse bar to engage said seat to tension said chains and removable from said seat to slide retractively along the transverse bar for gathering the chains at the side wall to which the hinge bracket is secured, said transverse rod being adapted to swing rearwardly of the truck body incidental to hinging of the movable part of the hinge bracket on the hinge pin that extends through the fixed part of the hinge bracket and said transverse rod being slideable through said sleeve portion of the movable bracket to retract the transverse rod through said sleeve portion to said other position with the chains in said gathered position between the bracket part on said bar and the hinge bracket.

References Cited in the file of this patent

UNITED STATES PATENTS

| D. 44,925 | Hoye | Nov. 25, 1913 |
| 1,016,479 | Coyne | Feb. 6, 1912 |
| 1,637,748 | Harmon | Aug. 2, 1927 |
| 2,028,666 | Henry | Jan. 21, 1936 |
| 2,046,824 | Kenney | July 7, 1936 |
| 2,136,042 | Cornell | Nov. 8, 1938 |
| 2,612,221 | Dellapent | Sept. 30, 1952 |
| 2,695,192 | Strom | Nov. 23, 1954 |

FOREIGN PATENTS

| 19,046 | Great Britain | Aug. 25, 1906 |